March 10, 1953 J. E. TYLER 2,630,707
RHEOLOGICAL INSTRUMENT

Filed Sept. 14, 1950 2 SHEETS—SHEET 1

INVENTOR.
JOHN E. TYLER
BY Eric E. Franke

March 10, 1953 J. E. TYLER 2,630,707
RHEOLOGICAL INSTRUMENT
Filed Sept. 14, 1950 2 SHEETS—SHEET 2

INVENTOR.
JOHN E. TYLER
BY

Patented Mar. 10, 1953

2,630,707

UNITED STATES PATENT OFFICE 2,630,707

RHEOLOGICAL INSTRUMENT

John E. Tyler, Riverside, Conn., assignor to Interchemical Corporation, New York, N. Y., a corporation of Ohio Application September 14, 1950, Serial No. 184,881

4 Claims. (Cl. 73—59)

This invention relates to an instrument and to methods for measuring rheological properties of liquids.

It is an object of the invention to provide an improved instrument and new and improved methods for such rheological measurements.

It is a more specific object to provide a simple rheological measuring device which is characterized by high sensitivity over an inherently wide measuring range.

It is a still further object to provide improved means and methods for continuous rheological measurements of test fluids which are subject to variations in their rheological properties, by comparing them with standard fluids the rheological properties of which are known.

Other objects of the invention will be apparent from the description and the accompanying drawing, wherein—

Figure 1:
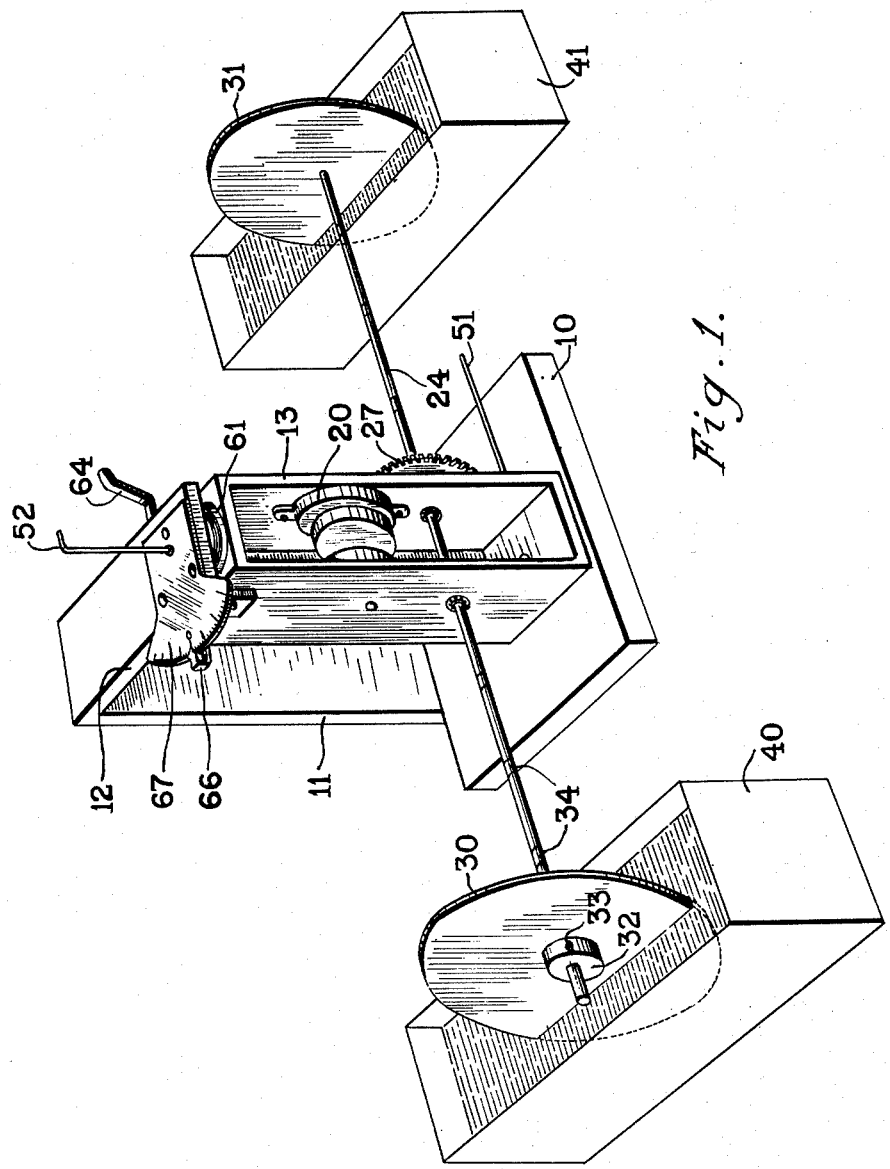
Figure 1 is a perspective view of an embodiment of the invention.
Figure 2:
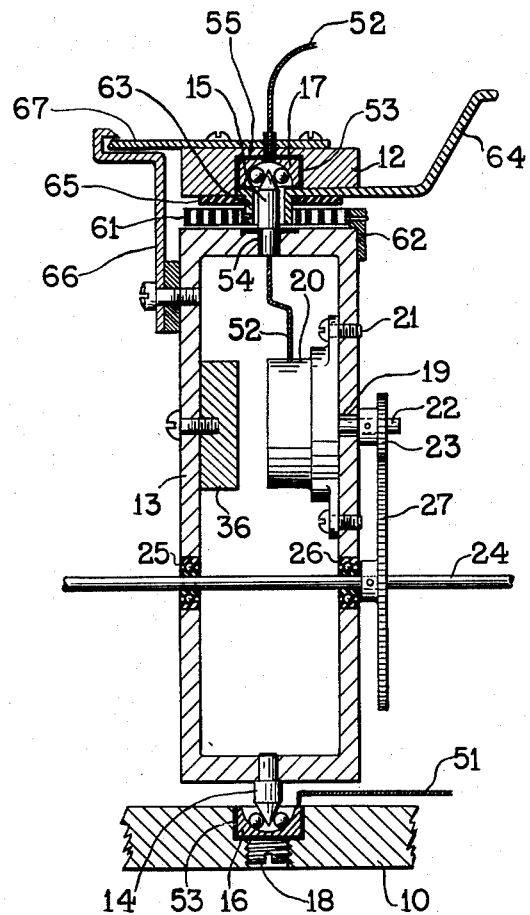
Figure 2 is a vertical, partly sectional elevation.

Referring in more detail to the drawings, there is shown a base 10 having a bracket 11 attached to it. Held between the overhanging part 12 of the bracket and the base is a frame 13 which is rotatably mounted, as shown in Figure 2, by means of the pins 14 and 15 fitting into ball bearings of which the ball bearing 16 is inserted into the base and the ball bearing 17 is set in the aforementioned overhanging part of the bracket. At least one of the ball bearings is made adjustable, as shown, by means of a set screw 18.

Mounted within the frame which, for example, is 5¾ inch high, 1¼ inch wide and 1½ inch deep, is a small, 60 cycle-110 volt synchronous motor 20, operating at, say, 600 R. P. M. By means of screws, such as shown at 21, the base of the motor is fastened to one of the side walls of the frame which has a boring 19 of sufficiently large diameter to provide clearance for the motor shaft 22, having a diameter of, say, ⅛ inch and extending from the base of the motor through the frame. Attached to the shaft is a pinion 23 which, according to this embodiment, has 12 teeth at a pitch of 32.

A shaft 24, having a diameter of, say, ¼ inch and a length of 13 inch., is held by the ball bearings 25 and 26 inserted into borings provided in the frame. Preferably, the axis of rotation of the frame, the shaft 22 extending from the motor and the shaft 24 lie in the same vertical plane. The distance from one shaft to the other is such that a spur wheel 27, attached to shaft 24 and having, say, 112 teeth at a pitch of 32, meshes with the foregoing pinion.

Disks, such as the disks 30 and 31 are provided to be attached to the arms of the shaft 24 extending from the frame 13. A first set of two disks has a diameter of, say, 4½ inch and a thickness of ⅟₁₆ inch. For one specific purpose of the invention, additional disks are provided, which are interchangeable with the disks of the first set. These additional disks have the same diameter but different thicknesses, or the same thickness but different diameters, or they vary in diameter and thickness from the first set of disks. The disks are fixed in position on the shaft by means of hubs 32 and set screws 33. As indicated by the numeral 34, the shaft 24 bears a number of equally distanced markings which are for the purpose of accurately positioning the disks relative to each other and to the axis of rotation of the frame.

As shown, the disks are inserted into tanks 40 and 41, one of which is intended as a receptacle for a standard liquid and the other as a receptacle for a sample liquid. For one particular use of the device, the receptacle for the sample liquid is to be furnished, in the known manner, with an inlet preferably at the bottom, a baffle plate underneath the disk to distribute the incoming liquid evenly in the receptacle, and an overflow pipe to keep the liquid at a constant level which, incidentally, must be exactly the same in both tanks during the testing.

Current is supplied to the motor by means of two wires. The wire 51 leads from a power source to the ball bearing 16 and from there through the pin 14 and the frame 13 to one terminal of the motor, while the wire 52 connects the other terminal to the pin 15 and the ball bearing 17, and thence connects to the power source. As indicated by the numerals 53, 54 and 55, the bearings are insulated against the base 10, the overhanging part 12 of the bracket, and the frame 13, respectively.

The instrument is fitted with at least one helical spring to counteract torsional forces exerted upon the axis of rotation of shaft 24 and frame 13. While I find it convenient to connect a single helical spring between the top of frame 13 and the overhanging part 12 of the bracket, another identical spring can be connected between the bottom of the frame 13 and the base 12. According to the present embodiment, the spring 61 is fastened at one end to the clamp 62 and at the other end to the sleeve 63 which is mounted underneath the overhanging part 12 of the bracket so as to encompass the pin 15. Attached to one side of this sleeve is a lever 64 which is held being wedged between the overhanging part 12 of the bracket and a plate 65 attached underneath to the said part. The lever is held rigidly, but nevertheless, rotatably if some force is exerted. Upon turning, the tension of the spring is increased or decreased, depending upon the direction in which the lever is moved. The purpose of the lever is to set the instrument at zero, as determined by the pointer 66, mounted in cooperative alignment with an empirical scale 67 on top of the overhanging part 12 of the bracket.

The instrument must be properly balanced. For this purpose, a mass 36, equal to the mass of the motor 20, is fastened to the frame 13 opposite to the motor, while the mass of the pinion 23 and the spur wheel 27 is balanced by the pointer 66.

For comparing the consistency or viscosity of two fluids, the receptacles are filled each with one of the two fluids, preferably to a height well below the shaft of the disks when the latter are inserted in the receptacles. As long as two disks of equal dimensions and equal distance from the axis of rotation of the frame are turned at the same speed while partly immersed in the same fluid medium, no movement about the axis of rotation of the frame will occur. But if the disks are partly and equally immersed in fluids which differ in viscosity or consistency, the assembly will turn about the axis of rotation of the frame whereby the resistance of the restoring force provided by the helical spring will be partly overcome until an equilibrium is reached between these two forces. Since the amount of torsional force is proportional to the difference in viscosity or consistency of the two fluids, the scale can be calibrated directly in units of viscosity or consistency. If, in comparing a very viscous liquid with a standard having a much lower viscosity, the distance between the axis of rotation of the frame and the disk immersed in the very viscous liquid must be fore-shortened as against the distance between the axis of rotation of the frame and the other disk in order to obtain a balance point within the operative range of the helical spring, the viscosity or consistency of the sample liquid can be determined by applying a factor to the scale reading. It is the purpose of the markings 34 on the shaft 24 to indicate fore-shortened distances providing factors which are simple multiples of the scale reading.

Scale readings obtained with one set of identical disks immersed in two different fluids are characteristic of the differences in internal properties of the two fluids. By filling the two receptacles with the same fluid and replacing one of the two identical disks by another disk having the same diameter but different thickness, or having the same thickness but a different diameter, or differing in diameter and thickness from the remaining disk, and operating the instrument, the resultant scale reading is influenced, in part, by the effect of surface characteristics of the fluid. This effect of surface characteristics is proportional to the difference in the length of lines of contact between the disk and the fluid surface on one side and the disk and the fluid surface on the other side. Obviously, the effect can also be obtained by immersing two identical disks to a different degree instead of employing disks of different dimensions.

The use of the device in the above-described manner permits the determination of surface characteristics of fluids and furnishes data relating to surface drag and, indirectly, to surface tension of fluids.

For example, the two receptacles are filled to equal levels with the liquid to be tested. Identical disks are mounted on the shaft at equal distances from the center and, while the instrument is operated, the pointer is adjusted to read zero. One of the disks is then replaced by another, having the same diameter but greater thickness, and the fluid level of the receptacle receiving this disk is adjusted to be equal to that of the other receptacle. The torque at the substituted disk, resulting from the operation of the instrument, now differs from the torque at the original disk, because (a) there is a change in the average velocity of the rotating disk, (b) there is a change in the immersed surface area of the disk and (c) there is a change in the effect of surface characteristics of the fluid because of the change in the length of line of contact between the disk and the fluid surface. Since the values of (a) and (b) can be determined from the experimental conditions, they can be applied to correct the scale reading. By calibrating the scale of the instrument in force units and dividing the corrected reading by the difference in the length of the lines of contact between the fluid surface and the two disks, surface characteristics per unit length are obtained.

I claim:

1. An instrument for testing rheological properties of fluids, comprising two receptacles for holding samples of fluid, two disks of equal dimensions fastened to a common connecting shaft arranged to partly immerse one of the said disks in the fluid in one receptacle and to partly immerse the other of the said disks in the fluid in the other receptacle, a support for the said common shaft rotatably fitted to permit the said shaft to turn freely about its center in the horizontal plane, means mounted on the said support for rotating the said connecting shaft about its axis, means for opposing torsional forces turning the said shaft about its center in the horizontal plane and for restoring the said shaft to an initial position upon removal of such torsional forces, and means indicating the degree of angular displacement of the shaft from the initial position.

2. An instrument according to claim 1, provided with markings on the said common connecting shaft to readily attach the said two disks to the shaft each at an equal distance from the center of rotation in the horizontal plane of the said shaft and to foreshorten the distance between one of the disks and the said center of rotation to a predetermined fraction of the distance between the other disk and the said center of rotation.

3. An instrument for testing rheological properties of fluids, comprising two receptacles for holding samples of fluid, two disks of equal diameter but unequal thickness fastened to a common connecting shaft arranged to partly immerse one of the said disks in the fluid in one receptacle and to partly immerse the other of the said disks in the fluid in the other receptacle, a support for the said common shaft rotatably fitted to permit the said shaft to turn freely about its center in the horizontal plane, means mounted on the said support for rotating the said connecting shaft about its axis, means for opposing torsional forces turning the said shaft about its center in the horizontal plane and for restoring the said shaft to an initial position upon removal of such torsional forces, and means indicating the degree of angular displacement of the shaft from the initial position.

4. An instrument for testing rheological properties of fluids, comprising two receptacles for holding samples of fluid, two disks of equal thickness but unequal diameter fastened to a common connecting shaft arranged to partly immerse one of the said disks in the fluid in one receptacle and to partly immerse the other of the said disks in the fluid in the other receptacle, a support for the said common shaft rotatably fitted to permit the said shaft to turn freely about its center in the horizontal plane, means mounted on the said support for rotating the said connecting shaft about its axis, means for opposing torsional forces turning the said shaft about its center in the horizontal plane and for restoring the said shaft to an initial position upon removal of such torsional forces, and means indicating the degree of angular displacement of the shaft from the initial position.

JOHN E. TYLER.

REFERENCES CITED

The following references are of record in the file of this patent:

UNITED STATES PATENTS

| Number | Name | Date |
| --- | --- | --- |
| 1,664,752 | Konig | Apr. 3, 1928 |
| 2,092,640 | Dallman | Sept. 7, 1937 |
| 2,280,947 | Gulliksen | Apr. 28, 1942 |